United States Patent
Heldibridle et al.

(10) Patent No.: US 7,192,632 B2
(45) Date of Patent: Mar. 20, 2007

(54) GLASSWARE SCARF

(76) Inventors: Brian L. Heldibridle, 11 Harvest Dr., Gettysburg, PA (US) 17325; Eileen J. Heldibridle, 11 Harvest Dr., Gettysburg, PA (US) 17325

( * ) Notice: Subject to any disclaimer, the term of this patent is extended or adjusted under 35 U.S.C. 154(b) by 165 days.

(21) Appl. No.: 10/896,864

(22) Filed: Jul. 23, 2004

(65) Prior Publication Data

US 2006/0019060 A1    Jan. 26, 2006

(51) Int. Cl.
    *B65D 23/06* (2006.01)
(52) U.S. Cl. .................. 428/80; 428/102; 428/136; 215/392
(58) Field of Classification Search ............. 428/80, 428/102, 136, 4, 5; 215/392; 222/108
    See application file for complete search history.

(56) References Cited

U.S. PATENT DOCUMENTS

| | | | |
|---|---|---|---|
| 2,025,963 A | 12/1935 | Voelcker | |
| 2,035,384 A | 3/1936 | Hinchliff | |
| 2,343,287 A | 3/1944 | Elsaesser | |
| 3,195,847 A | 7/1965 | Squires | |
| 3,797,796 A | 3/1974 | Lansdowne | |
| 3,914,797 A | 10/1975 | Stembridge | |
| 4,340,146 A | 7/1982 | Stratton | |
| 4,867,214 A | 9/1989 | Fuller | |
| 4,953,823 A | 9/1990 | Sheaffer et al. | |
| D423,299 S | 4/2000 | Burrus | |
| 6,228,459 B1 | 5/2001 | Bujalski | |
| D455,053 S | 4/2002 | Frank | |
| D455,935 S | 4/2002 | Detiveaux | |

FOREIGN PATENT DOCUMENTS

| | | |
|---|---|---|
| GB | 2 180 817 A | 4/1987 |
| GB | 2 374 587 A | 10/2002 |

*Primary Examiner*—Alexander S. Thomas
(74) *Attorney, Agent, or Firm*—Richard C. Litman

(57) ABSTRACT

The glassware scarf is a flexible, absorbent device used to soak up excessive condensation from glassware. The scarf is wrapped about a stem of a glass, such as a wineglass, sherbet glass, etc., and absorbs condensation that drips down from the bowl of the glass. The glassware scarf has a rectangular central body portion and first and second ends tapering from opposite ends of the rectangular central body portion. A slit is defined in the rectangular body portion adjacent to the first end. The glassware scarf is wrapped about the stem of the glass, and the second end is drawn through the slit and pulled so that the glassware scarf is secured about the stem.

10 Claims, 4 Drawing Sheets

GLASSWARE SCARF

BACKGROUND OF THE INVENTION

1. Field of the Invention

The present invention relates to absorbent devices, and particularly to an absorbent scarf to be wrapped about the stem of a wineglass or the like.

2. Description of the Related Art

Wineglasses or water goblets are often used at dinner parties, restaurants or meals at home to serve drinks. When filled with cold liquids, such as water or white wine, condensation accumulates on the outside of the glass and eventually falls onto the user's hand. It becomes quite bothersome to the individual holding the glass to continually have condensation drip down.

A variety of absorbent devices exist, the function of which is to soak up excess liquid. Often these devices are wrapped about a wine bottle to catch liquid that might otherwise drip when the wine is poured. Additionally, other absorbent devices may be placed under or around the base of a glass and thereafter absorb any condensation dripped from a glass down the stem.

A problem that arises with these absorbers is that they are either used with wine bottles to prevent dripping from the bottle during pouring, or they are used on the base of the glass. Having an absorbing material on the base does not prevent condensation from dripping onto the individual's hand, as water goblets and wine glasses are held, not at the base, but on the stem itself. Further, these absorbing devices may not provide the aesthetic qualities one would like associated with wineglasses or goblets.

U.S. Pat. No. 6,228,459, issued May 8, 2001 to D. Bujalski, describes an absorbent wine bottle wrap that may absorb any liquid that drips from the bottle. The wrap is placed around the neck of a bottle, and one corner portion wraps about the bottle and inserts within a slit defined in the wrap. The corner portion is pulled snug through the slit, securing the wrap about the bottle.

U.K. Patent No. 2,180,817, published Apr. 8, 1987, describes an absorbent drip-collecting collar. The collar may be folded in a number of ways and fitted about the neck of a liquid-holding container. The collar prevents dripping from the container when liquid is poured from the container.

U.S. Pat. No. 2,035,384, issued Mar. 24, 1936 to R. Hinchliff, describes an absorbent textile jacket. The jacket is made from knitted tubing, which may have elastic bands around the ends of the tubing, and encompasses the base of a glass to absorb condensation that has dripped down from the bowl of the glass.

Other patents showing absorbent devices include U.S. Design Pat. No. 423,299, issued Apr. 25, 2000 to D. Burrus (stretchable fabric cover for a container); U.S. Design Pat. No. 455,053, issued Apr. 2, 2002 to S. Frank (stemware accessory); U.S. Design Pat. No. 455,935, issued Apr. 23, 2002 to P. Detiveaux (glass holder); U.S. Pat. No. 2,025,963, issued Dec. 31, 1935 to C. Voelcker (footed glass sandal); and U.S. Pat. No. 2,343,287, issued Mar. 7, 1944 to F. Elsaesser (antidrip device).

Additional patents showing absorbent devices include U.S. Pat. No. 3,195,847, issued Jul. 20, 1965 to E. Squires (absorbable support); U.S. Pat. No. 3,797,796, issued Mar. 19, 1974 to H. Lansdowne (coaster); U.S. Pat. No. 3,914,797, issued Oct. 28, 1975 to B. Stembridge (invalid bib); U.S. Pat. No. 4,340,146, issued Jul. 20, 1982 to J. Stratton (disposable coaster); U.S. Pat. No. 4,867,214, issued Sep. 19, 1989 to D. Fuller (dual function jacket for bottle-shaped containers); U.S. Pat. No. 4,953,823, issued Sep. 4, 1990 to W. Sheaffer et al. (coaster and wipe); and U.K. Patent No. 2,374,587, published Oct. 23, 2002 (bottle drip absorber).

There is a need for an absorbent device that fits about the stem of a glass and beneath the bowl of the glass, which additionally is aesthetically pleasing to an individual.

None of the above inventions and patents, taken either singly or in combination, is seen to describe the instant invention as claimed. Thus, a glassware scarf solving the aforementioned problems is desired.

SUMMARY OF THE INVENTION

The glassware scarf is a flexible, absorbent device used to soak up excessive condensation from glassware. The scarf is wrapped about a stem of a glass, such as a wineglass, sherbet glass, etc., and absorbs condensation that drips down from the bowl of the glass. The glassware scarf has a rectangular central body portion and first and second ends tapering from opposite ends of the rectangular central body portion. A slit is defined in the rectangular body portion adjacent to the first end. The glassware scarf is wrapped about the stem of the glass, and the second end is drawn through the slit and pulled so that the glassware scarf is secured about the stem.

The first end and the second end may be triangular, bulbous or shaped in any manner suitable for allowing the second end to be drawn through the slit. The slit has a general rectangular shape, but may alternatively be circular, diamond-shaped, square-shaped, etc.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
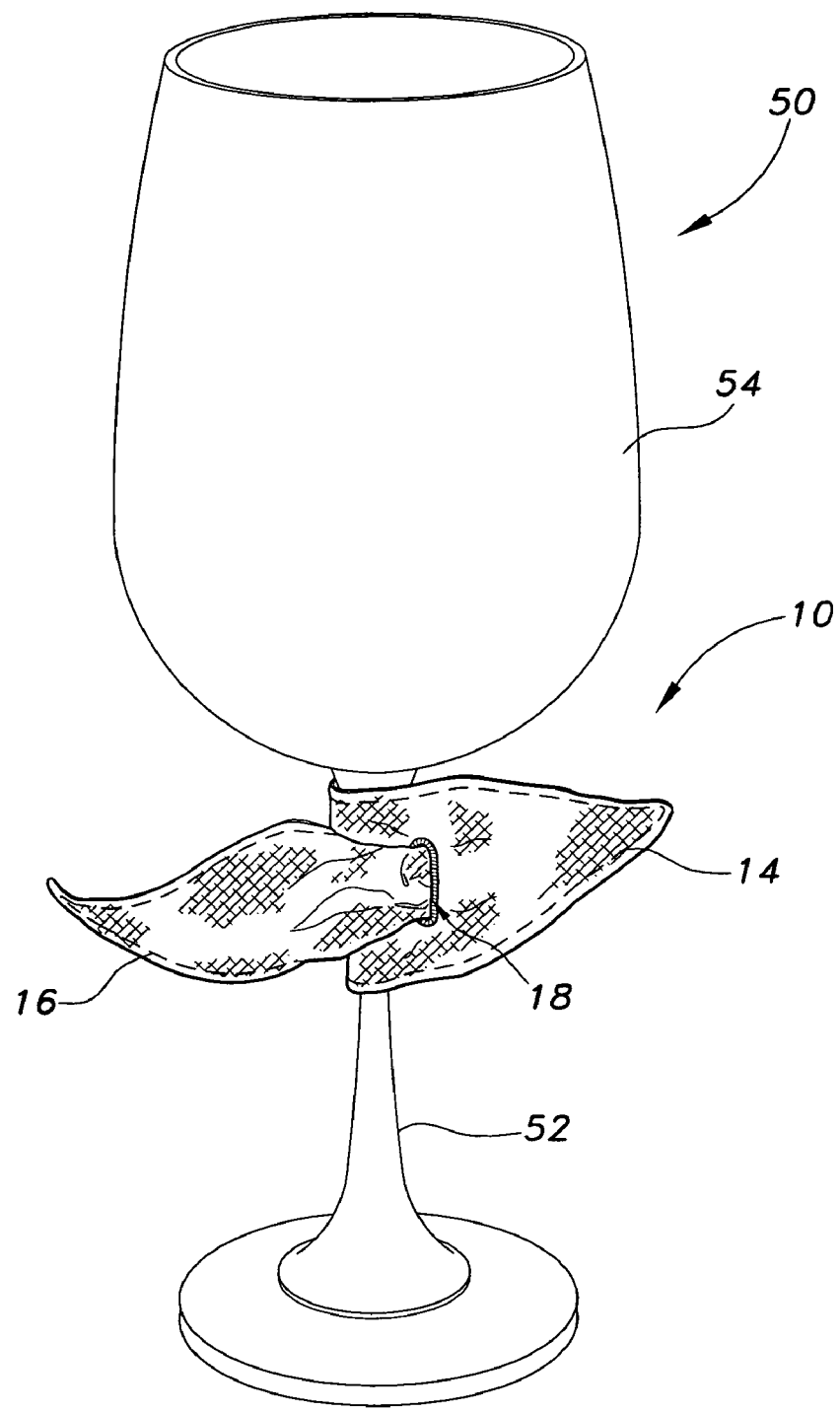
FIG. 1 is an environmental, perspective view of a glassware scarf according to the present invention.

The present invention is a glassware scarf, designated generally as 10 in the drawings. The glassware scarf 10 is wrapped about a stem of a glass, such as a wineglass, sherbet glass, or generally any form of glassware having a stem, in order to prevent condensation on the bowl section of the glass from dripping down the stem.

Figure 2:
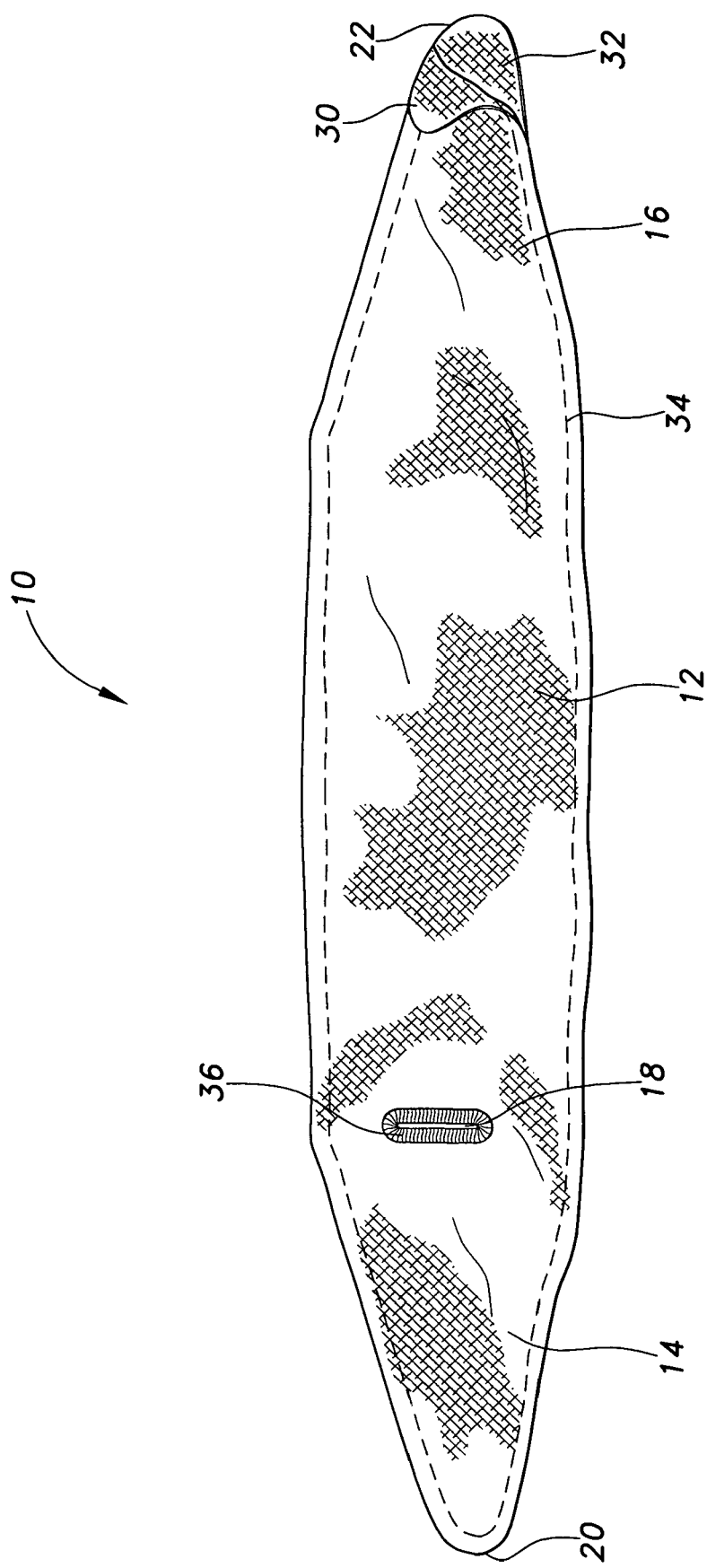
FIG. 2 is a top plan view of the glassware scarf according to the present invention.

Referring first to FIG. 1, the glassware scarf 10 is made of a flexible, absorbent material, such as cotton or the like. The material may be natural, synthetic, or a blend, and is preferably a fabric. The scarf 10 is wrapped about the stem 52 of a glass 50. Referring to FIG. 2, the scarf 10 has a central rectangular body portion 12 and first 14 and second 16 opposing ends extending from the central rectangular body portion 12. Viewed another way, the scarf 10 is a flat, flexible body having a hexagonal shape with two elongated parallel sides and two opposing elongated triangular ends 14 and 16, the corners of the hexagon being rounded. A slit 18 is located on the central rectangular body portion 12 adjacent to the first end 14. The glassware scarf 10 is held about the stem 52 of the glass 50, and a user wraps the central rectangular body portion 12 about the stem 52. The second end 16 is drawn through the slit 18 and pulled taut such that the glassware scarf 10 is secured about the stem 52.

It will be understood that the hexagonal shape is not critical to the present invention. For example, the scarf 10 may be pentagonal, with the pentagon having two elongated parallel sides, a single, elongated, triangular, tapered or bulbous end, and a slit defined opposite the tapered end. It is only necessary that the scarf 10 have an elongated, flexible, absorbent body with at least one tapered end and a slit opposite the tapered end so that the tapered end can be drawn through the slit to secure the scarf 10 around the stem 52 of the glassware 50.

Although the glassware scarf 10 may be made from a single layer of material, preferably the glassware scarf 10 has a first layer 30 and a second layer 32 affixed to the first layer 30 by a serge stitching 34 along the peripheral edges of the first layer 30 and the second layer 32 to form a seam or hem. It will be understood that any other type of stitching may alternatively be used. The two layers 30 and 32 affixed to one another provide the glassware scarf 10 with a greater absorbency than one layer alone. It will be understood that the glassware scarf 10 could be made from more than two layers, provided that the thickness of the scarf does not inhibit insertion of an end of the scarf 10 through the slit 18 or adversely affect the aesthetic appearance of the scarf 10.

The rectangular body portion 12 has a length of approximately 2.5 inches and a width of approximately 1.625 inches. The first end 14 has a first terminus 20, and the second end 16 has a second terminus 22. The first end 14 is approximately two inches in length from the first terminus 20 to the central rectangular body portion 12, and the second end is approximately two inches in length from the second terminus 22 to the central rectangular body portion 12. The width of the first end 14 and the width of the second end 16 each decrease from the junction of the ends 14 and 16 with the rectangular body portion 12 to the respective termini 20 and 22, defining an isosceles triangular shape. The first end 14 and the second end 16 are tapered, but additionally may be bulbous or shaped in any manner sufficient to allow the second end 16 to be drawn through the slit 18.

The slit 18 is located on the central rectangular body portion 12 adjacent to the first end 14. The slit 18 is located slightly greater than two inches from the first terminus 20. The slit 18 has a length of approximately 0.75 inches and a width of approximately 0.166 inches. The length and the width of the slit 18 may be variable. The slit 18 has a general rectangular shape, but may alternatively be circular, diamond-shaped, square-shaped, etc. The slit 18 has buttonhole stitching 36 around the peripheral edge of the slit 18. The buttonhole stitching 36 provides reinforcement about the slit 18. While one slit 18 is shown, the present invention is not limited to one slit. For example, the glassware scarf may be furnished with a slit defined at each of the opposing ends 14 and 16 of the central rectangular body 12 so that if one slit becomes worn or frayed, the slit at the opposite end may be used to secure the scarf around the glassware stem.

Figure 3:
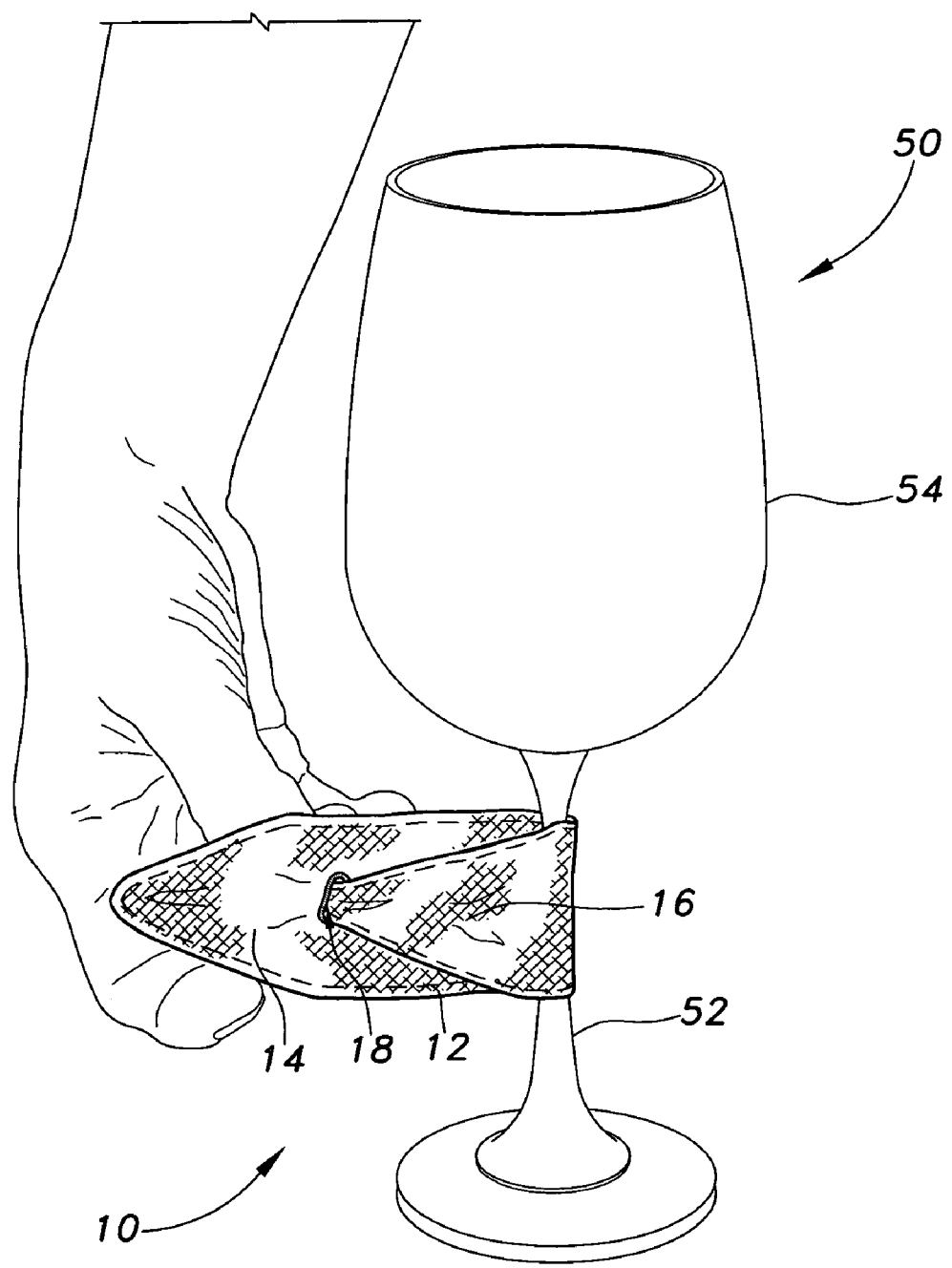
FIG. 3 is an environmental, perspective view of the glassware scarf according to the present invention wrapped about a glass stem.
Figure 4:
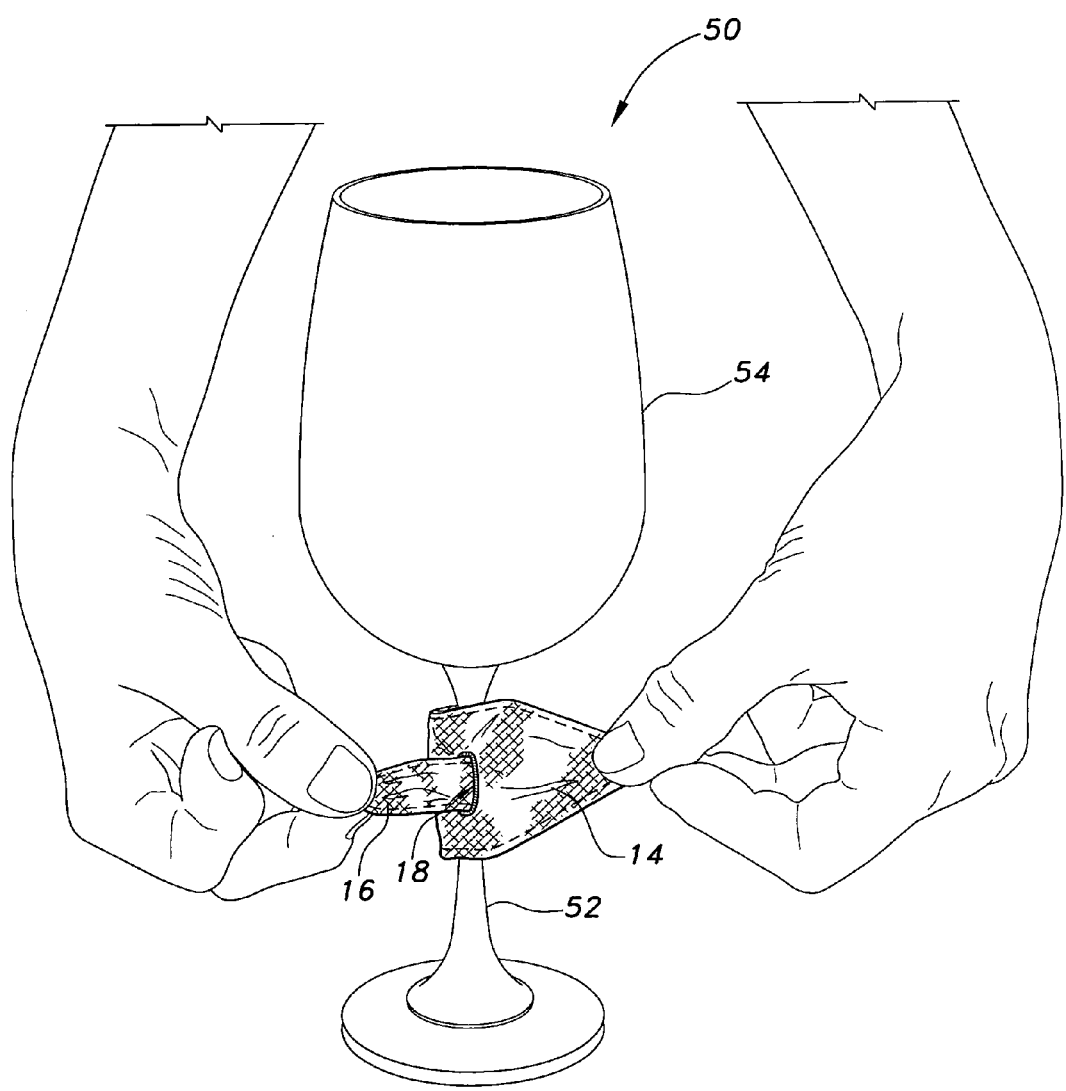
FIG. 4 is an environmental, perspective view of the glassware scarf according to the present invention tied about the glass stem.

FIGS. 3 and 4 show a user tying the glassware scarf 10 about the stem 52 of the glass 50. The scarf 10 catches condensation that has dripped down from the bowl section 54 of the glass. The user places the glassware scarf 10 against the stem 52. The user pulls the second end 16 of the scarf 10 through the slit 18 provided on the central rectangular body portion 12. The first end 14 is folded over the second end 16 as the second end 16 is pulled taut, thus fixing the glassware scarf 10 securely about the stem 52 of the glass 50.

It is to be understood that the present invention is not limited to the embodiment described above, but encompasses any hand all embodiments within the scope of the following claims.

We claim:

1. A combined drinking glass and glassware scarf comprising:
   a drinking glass, said drinking glass having a bowl section, a substantially horizontal base and a stem extending between and connecting said bowl section to said horizontal base; and
   a glassware scarf comprising a body made of a flexible, absorbent material having a first layer and a second layer, the first layer being affixed to the second layer by serge stitching about a periphery of the body;
   the body having a central rectangular body portion with two elongated parallel sides each having a length of approximately 2.5 inches, two shorter sides each having a length of approximately 1.625 inches, and a pair of opposing ends extending from the two shorter sides of the central rectangular body portion;
   the body having at least one slit defined therein, the slit being adjacent to one of the opposing ends, said at least one slit having buttonhole stitching around a peripheral edge for reinforcing the slit;
   the end of the body opposite the at least one slit being drawn through the at least one slit and securing the glassware scarf about said stem of said drinking glass.

2. The combined drinking glass and glassware scarf of claim 1, wherein each of the opposing ends is triangular in shape.

3. The combined drinking glass and glassware scarf of claim 1, wherein each of the opposing ends is bulbous in shape.

4. The combined drinking glass and glassware scarf of claim 1, wherein the material is a natural fiber material.

5. The combined drinking glass and glassware scarf of claim 4, wherein the natural fiber material is cotton fabric.

6. The combined drinking glass and glassware scarf of claim 1, wherein the material is a synthetic material.

7. The combined drinking glass and glassware scarf of claim 1, wherein the slit is approximately three-quarters of an inch in length.

8. The combined drinking glass and glassware scarf of claim 1, wherein one of the opposing ends has a first terminus, said one of the opposing ends being approximately two inches in length from the central rectangular body portion to the first terminus.

9. The combined drinking glass and glassware scarf of claim 1, wherein the end opposite the first terminus has a second terminus, the end having the second terminus being approximately two inches in length from the central rectangular body portion to the second terminus.

10. The combined drinking glass and glassware scarf of claim 1, wherein said body has a second slit defined therein adjacent to the end opposite said at least one slit.

* * * * *